United States Patent
Albrecht et al.

(10) Patent No.: US 11,882,043 B2
(45) Date of Patent: Jan. 23, 2024

(54) METHOD AND SYSTEM FOR PROVIDING TIME-CRITICAL SERVICES VIA A FLOW CONTROL ENVIRONMENT

(71) Applicant: Siemens Aktiengesellschaft, Munich (DE)

(72) Inventors: Harald Albrecht, Nuremberg (DE); Stephan Höme, Schwabach (DE); Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/028,388

(22) PCT Filed: Jul. 22, 2021

(86) PCT No.: PCT/EP2021/070525
§ 371 (c)(1),
(2) Date: Mar. 24, 2023

(87) PCT Pub. No.: WO2022/063458
PCT Pub. Date: Mar. 31, 2022

(65) Prior Publication Data
US 2023/0261998 A1   Aug. 17, 2023

(30) Foreign Application Priority Data

Sep. 28, 2020 (EP) .................................... 20198692

(51) Int. Cl.
*H04J 3/14* (2006.01)
*H04L 47/20* (2022.01)
(Continued)

(52) U.S. Cl.
CPC .......... *H04L 47/20* (2013.01); *H04L 47/2475* (2013.01); *H04L 63/0236* (2013.01); *H04L 63/0876* (2013.01)

(58) Field of Classification Search
CPC . H04L 47/20; H04L 47/2475; H04L 63/0236; H04L 63/0876
(Continued)

(56) References Cited

U.S. PATENT DOCUMENTS 10,623,410 B2 * 4/2020 Leibmann ............... H04L 67/10
11,032,239 B1 * 6/2021 Maria ................. H04L 61/5084
(Continued)

FOREIGN PATENT DOCUMENTS

EP   3544265   9/2019
EP   3588908   1/2020
(Continued)

OTHER PUBLICATIONS

PCT International Search Report dated Nov. 5, 2021 based on PCT/EP2021/070525 filed Jul. 22, 2021.

*Primary Examiner* — Chuong T Ho
(74) *Attorney, Agent, or Firm* — Cozen O'Connor

(57) ABSTRACT

Method and system for providing time-critical services via a flow control environment, wherein at least one respective server component is provided for each service, wherein the server component is formed by a flow control component that is loadable into the flow control environment and executed there, where a configuration unit for at least one gateway component of a subnetwork forming the flow control environment ascertains globally valid access information associated with respective addressing information of the server components that is valid within the subnetwork, based on a mode of operation predefined via the configuration unit, one or more gateway components connected in parallel and/or in series are used, and where the at least one gateway component forwards service access requests to the server components in accordance with the forwarding and/or filter rules and the mode of operation.

16 Claims, 4 Drawing Sheets

(51) Int. Cl.
*H04L 47/2475* (2022.01)
*H04L 9/40* (2022.01)

(58) Field of Classification Search
USPC .............................................. 370/235, 235.1
See application file for complete search history.

(56) References Cited

U.S. PATENT DOCUMENTS

| 11,483,285 | B2 | * | 10/2022 | Tang | |
| 2014/0269513 | A1 | * | 9/2014 | Yu | H04L 67/303 |
| | | | | | 370/328 |
| 2015/0058967 | A1 | * | 2/2015 | Ringdahl | H04L 63/0254 |
| | | | | | 726/11 |
| 2019/0097867 | A1 | * | 3/2019 | Qiu | G06F 9/54 |
| 2021/0203731 | A1 | * | 7/2021 | Garty | H04L 41/0853 |
| 2022/0137605 | A1 | | 5/2022 | Albrecht et al. | |

FOREIGN PATENT DOCUMENTS

| EP | 3715983 | 9/2020 |
| EP | 3715986 | 9/2020 |
| EP | 3751421 | 12/2020 |
| EP | 3962026 | 3/2022 |
| WO | 2020249345 | 12/2020 |

\* cited by examiner

METHOD AND SYSTEM FOR PROVIDING
TIME-CRITICAL SERVICES VIA A FLOW
CONTROL ENVIRONMENT

CROSS-REFERENCE TO RELATED APPLICATIONS

This is a U.S. national stage of application No. PCT/EP2021/070525 filed 22 Jul. 2021. Priority is claimed on European Application No. 20198692.4 filed 28 Sep. 2020, the content of which is incorporated herein by reference in its entirety.

BACKGROUND OF THE INVENTION

1. Field of the Invention

The present invention relates to a method and a system for providing time-critical services, particularly in an industrial automation system.

2. Description of the Related Art

Industrial automation systems normally comprise a multiplicity of automation devices networked with one another via an industrial communication network, and serve to control or regulate installations, machines or devices in a manufacturing automation or process automation environment. Due to time-critical boundary conditions in industrial automation systems, real-time communication protocols, such as PROFINET, PROFIBUS, Real-Time Ethernet or Time-Sensitive Networking (TSN) are predominantly used for communication between automation devices. In particular, control services or control applications can be automated and can be distributed among currently available servers or virtual machines of an industrial automation system depending on utilization.

Interruptions of communication connections between computer units of an industrial automation system or automation devices can result in an unwanted or unnecessary repetition of the transmission of a service request. Messages that are not or are not completely transmitted can, for example, prevent an industrial automation system from transitioning to or remaining in a safe operating condition.

In Ethernet-based communication networks, problems can occur if network resources for transmitting data streams or data frames with real-time requirements are used in contention for transmitting data frames with a substantial payload data content without special quality of service requirements. This can ultimately result in data streams or data frames with real-time requirements not being transmitted in accordance with a requested or required quality of service.

EP 3 588 908 A1 relates to an access control device for providing effective security protection during remote access to a system. The access control device comprises a front-end firewall with a first network connection for connecting a remote computer. A host is connected to the front-end firewall and is connected in turn to a back-end firewall. The back-end firewall provides a second network connection to connect the above system. In particular, through the second network connection, the back-end firewall scans system resources to which remote access is possible and defines system resources that the remote computer is allowed to access. In addition, the host provides information relating to the system resources that the remote computer can access via the first network connection.

PCT/EP2020/063144 discloses a method for providing control applications in which communication network addresses of flow control components that provide control applications, and also identifiers of the flow control components or server devices upon which the flow control components are executed are queried by a monitoring device. A configuration control device generates configuration information for a forwarding device from the queried communication network addresses and identifiers and from designations of the control applications. The forwarding device receives requests from terminal devices for the use of the control applications and forwards these to a respective flow control component according to the configuration information.

European patent application EP 3 715 986 A1 describes a method for automatically configuring an automation device in which a device management unit monitors whether an automation system identifier is assigned to the automation device. If the device management unit has recognized an assignment of this type, then it asks a central management unit of a cluster whether a description object in which the automation system identifier assigned to the automation device is stored already exists in a cluster state database with description objects for at least one node of the cluster. If a description object of this type does not exist, or if a description object of this type exists but is declared as inactive, then the device management unit generates, in the cluster state database, for a node identifier assigned to the automation device, a description object in which the automation identifier assigned to the automation device is stored.

European patent application 20193690.3 relates to a method for providing time-critical services to which at least one server component is assigned in each case, where the server component is formed by a flow component loadable into and executable in a flow control environment. A function unit for processing a communication protocol stack that is connected to a function unit assigned to the flow control environment for processing a communication protocol stack is made available for each of the server components. Each of the services comprises a directory service component for determining services provided via the flow control environment. The directory service components are interconnected via a separate communication interface. An aggregator component that is formed via a further flow control component and that makes information available relating to the services provided via the server component outside the flow control environment is connected to the separate communication interface.

Users of control applications for industrial automation systems implemented via container virtualization or comparable virtualization concepts expect integration of such applications into their existing infrastructure which is as uncomplicated as possible. Depending on the network connection and the flow control environment that is used, Open Platform Communications Unified Architecture (OPC UA) servers in particular come cross widely differing user-related configurations that must be taken into account by developers of control applications in automated configuration methods for the control applications. In the network connection, short IP address and TCP port number ranges on the user side present particular challenges for the integration of control applications into an existing infrastructure.

SUMMARY OF THE INVENTION

In view of the foregoing, it is an object to provide a system and method for providing time-critical services that enables a decoupling between services provided via container virtualization or comparable virtualization concepts, on one hand, and a respective flow control environment and network connection, on the other hand.

This and other objects and advantages are achieved in accordance with the invention by a system and method for providing time-critical services via a flow control environment, where at least one server component is assigned in each case to the services, and where the server component is formed by a flow control component loadable into and executable in the flow control environment. A configuration unit for at least one gateway component of a subnetwork comprising the flow control environment determines globally valid access information assigned to addressing information of the server components that is valid within the subnetwork. Based on an operating mode predefined via the configuration unit, one or more gateway components connected in parallel and/or in series are used. The locally valid addressing information comprises, in particular, communication addresses, port numbers, host names or complete domain names. The at least one gateway component is a load balancer or a reverse proxy. A number and a connection of load balancers or reverse proxies to be used are predefined by the operating mode.

The flow control components are, in particular, software containers that each execute on a host operating system of a server device isolated from other software containers or container groups, e.g., pods, within the flow control environment. Alternative micro-virtualization concepts, such as snaps, can essentially also be used for the flow control components.

The flow control environment can comprise, for example, a docker engine or a snap core that executes on a server device. The software containers each advantageously use a kernel of the host operating system of the server device jointly with other software containers executing on the respective server device. Memory maps for the software containers can be retrieved, for example, from a storage and provisioning system to which a multiplicity of users have read or write access.

In accordance with the invention, the configuration unit transmits forwarding or filter rules that map the access information to the at least one gateway component. An aggregator component is further provided in order to provide or make known the globally valid access information for use of the services outside the subnetwork. In addition, the at least one gateway component forwards the service access requests, in particular from outside the subnetwork, to the server components in accordance with the forwarding or filter rules and the operating mode.

The present invention enables a simple development and use of time-critical services or control applications, in particular control applications with OPC UA functionality, without having to take account of specific boundary conditions with respect to the network connection and flow control environment, such as Edge App Runtime Engine, Hyper-Converged Infrastructure or Cloud Platform, during the development and installation. This is achieved above all by an automatic configuration of gateway components for the subnetwork comprising the respective flow control environment via a selection of a suitable operating mode.

In particular, OPC UA Secure Channel can be correctly terminated with the present invention upon entry into the subnetwork comprising the flow control environment. In this way, communication is possible within the subnetwork without certificates or with subnetwork-specific certificates. This enables a decoupling between the subnetwork-internal security concepts and security concepts for external communication. OPC UA WebSocket connections can further be correctly terminated upon entry into the subnetwork and, for example, OPC UA server applications without WebSocket support can be used via a subnetwork-internal transport layer connection.

In accordance with a preferred embodiment of the present invention, the server components or directory service components assigned to each of them transmit the addressing information that is valid within the subnetwork to the configuration unit or to the aggregator component. Only the aggregator component is advantageously accessible from outside the subnetwork comprising the flow control environment, so that the directory service components can be protected against external access. A plurality of mutually redundant aggregator components, for example, can be used for increased availability.

The server components or the directory service components advantageously transmit an identifier for each respective server component to the configuration unit. Based on this identifier, the configuration unit can reliably determine, for the respective server component, the globally valid access information assigned to addressing information each of the server component that is valid within the subnetwork. The identifiers can, for example, be server identifiers or software container identifiers. The forwarding or filter rules preferably map assignments between addressing information assigned to the identifiers that is valid within the subnetwork and the globally valid access information, and comprise rules for port forwarding.

In accordance with a further preferred embodiment of the present invention, the globally valid access information comprises addressing information and access authorizations. The access authorizations are made available following successful user or device authentication. These access authorizations are advantageously mapped onto selected services, in particular for selected users or devices, by the forwarding or filter rules.

Based on the operating mode predefined via the configuration unit, one or more globally valid IP addresses, an individual port for each server component or a common port for all server components or an individual domain name for each server component or a common domain name for all server components are preferably forwarded by the at least one gateway component onto the server components. Individual boundary conditions can thus be taken into account in the network connection of the subnetwork comprising the flow control environment via a selection of a suitable operating mode for a configuration of the at least one gateway component. In one selected operating mode, for example, only service access requests to server components of which the respective address information valid within the subnetwork simultaneously has a global validity are forwarded by the at least one gateway component.

The system in accordance with the invention for providing time-critical services via a flow control environment is provided to perform the method in accordance with the disclosed embodiments and comprises a flow control environment and a plurality of server components assigned in each case to a service and formed in each case by a flow control environment loadable into and executable in the flow control environment. At least one gateway component for a subnetwork comprising the flow control environment and a configuration unit for the at least one gateway component are further provided. The at least one gateway component is a load balancer or a reverse proxy. The configuration unit is configured to determine globally valid access information assigned to addressing information of each server component that is valid within the subnetwork and to transmit forwarding or filter rules mapping the access information to the at least one gateway component. Based on an operating mode predefined via the configuration unit, one or more gateway components connected in parallel and/or in series are used. A number and a connection of load balancers or reverse proxies to be used are predefined by the operating mode.

The system in accordance with the invention additionally comprises an aggregator component that is configured to make available the globally valid access information for use of the services outside the subnetwork. Conversely, the at least one gateway component is configured to forward service access requests to the server components in accordance with the forwarding or filter rules and the operating mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below based on an exemplary embodiment and with reference to the drawings, in which.

DETAILED DESCRIPTION OF THE EXEMPLARY EMBODIMENTS

Figure 1:
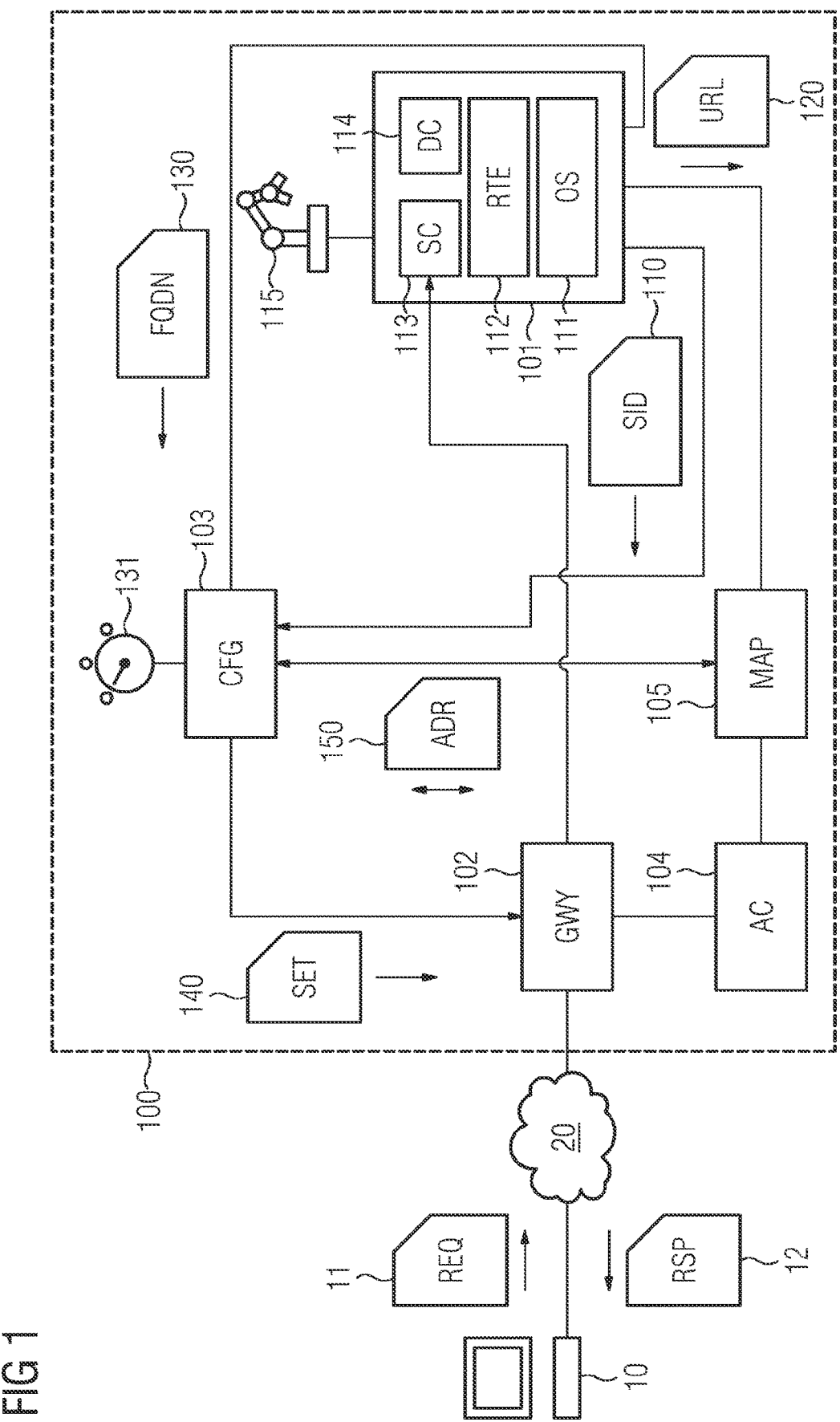
FIG. 1 shows an arrangement with a server component for the provision of services of an industrial automation system and with a gateway component in accordance.

The arrangement shown in FIG. 1 comprises a server device 101 for providing services or control and monitoring applications of an industrial automation system. The services or control and monitoring applications of the industrial automation system represent examples of time-critical services. In the present exemplary embodiment, the services or control and monitoring applications are provided based on Open Platform Communications Unified Architecture (OPC UA). The services or control and monitoring applications thus comprise interface definitions that can be used for permanent access to the services or control and monitoring applications.

The services can each comprise a plurality of similar or identical control and monitoring applications that are each provided by different server devices. A provision of a plurality of similar control applications on different server devices simultaneously can be controlled, for example, via Kubernetes DaemonSets.

The arrangement shown in FIG. 1 further comprises a terminal device 10 that is assigned to at least one user who, in the present exemplary embodiment, transmits requests 11 in accordance with OPC UA for use of the services via a communication network 20 to an automation system or subnetwork 100 comprising the server device 101, and correspondingly receives responses 12 or measured values and status messages from the server device. The communication network 20 is preferably designed as a time-sensitive network, in particular according to Institute of Electrical and Electronics Engineers (IEEE) 802.1Q, IEEE 802.1AB, IEEE 802.1AS, IEEE 802.1BA or IEEE 802.1CB.

The server device 101 preferably implements functions of control devices in industrial automation system, such as programmable logic controllers, or of field devices, such as sensors or actuators. In the present exemplary embodiment, the server device 101 serves to exchange control parameters and measured values with machines or devices 115 controlled by the server device 101. In particular, the server device 101 is provided for determining suitable control parameters from captured measured values.

In the present exemplary embodiment, the terminal device 10 is an operating and monitoring station and serves to visualize process data or measured values and control parameters that are processed or captured by the server device 101 or other automation devices. In particular, the terminal device 10 is used to display values of a control circuit and to modify control parameters or control programs.

At least one server component 113 that is formed by a flow control component loadable into and executable in a flow control environment 112 is assigned in each case to the services. The flow control environment 112 is provided via the server device 101 and is installed there as an application on a host operating system 111 of the server device 101. In addition, flow control components can be migrated in each case from the server device 101 onto a different server device for execution there, or can be executed simultaneously on other server devices. In the present exemplary embodiment, the flow control components are or comprise software containers that each execute on the host operating system 111 of the server device 101 isolated from other software containers, container groups or pods, within the flow control environment 112. The software containers use a kernel of the host operating system 111 of the server device 101 jointly with other software containers running on the server device 101.

An isolation of the flow control components or an isolation of selected operating system means from one another can be implemented, in particular, via control groups and namespacing. Process groups can be defined via control groups to restrict available resources for selected groups. Individual processes or control groups can be isolated or hidden from other processes or control groups by means of namespaces. Memory maps for software containers can be retrieved, for example, from a multiplicity of storage and provisioning systems to which users have read or write access.

In addition, the arrangement shown in FIG. 1 comprises at least one gateway component 102 for the subnetwork 100 comprising the server device 101. The gateway component 102 serves to forward service access requests 11 to server components 113 assigned to the service access requests 11. A configuration unit 103 that, in each case, determines globally valid access information 150 assigned to address information 120, 130 that is valid within the subnetwork 100 is provided for the gateway component 102. Based on an operating mode 131, predefinable via the configuration unit 103, one or more load balancers or reverse proxies connected in parallel and/or in series and comprised by the gateway 102 are used (see also FIGS. 3-5).

The locally valid addressing information comprises, in particular, communication network addresses, port numbers, host names or complete domain names. In the present exemplary embodiment, the configuration unit 103 determines an assignment between the addressing information 120, 130 valid within the subnetwork 100 and the globally valid access information 150 interacting with a comparison unit 105 which receives, in particular, details 120 relating to at least locally valid URLs from the server components 113. Alternatively, the server components 113 can transmit details 130 relating to fully qualified domain names (FQDNs) to the configuration unit 103 that determines globally valid access information 150 assigned to the FQDNs and makes this information available to the comparison unit 105.

The configuration unit 103 transmits forwarding or filter rules 140 that map the access information 150 to the gateway component 102. Based on this, the gateway component 102 forwards service access requests 11 to the server components 113 according to the forwarding or filter rules 140 and the operating mode 131.

At least one aggregator component 104 is further provided which, in the present exemplary embodiment, is connected to the comparison unit 105 and makes the globally valid access information 150 available for use of the services outside the subnetwork 100, in particular for users on the terminal device 10. A plurality of mutually redundant aggregator components 104 collating globally valid access information can essentially be used.

Two advantageous approaches are described below for automatically identifying communication endpoints for the server component 113. According to a first approach, a directory service component 114, via which a local directory service is implemented, is assigned to each server component 113. An approach of this type is described in detail in the European patent application 20193690.3, the disclosure content of which is incorporated by reference in its entirety here. In this case, the directory service components 114 transmit the addressing information 120 valid within the subnetwork 100 or the locally valid URLs via the comparison unit 105 to the configuration unit 103 and to the aggregator component 104.

An alternative to the above first approach consists in a use of markings that are attached to software containers. The markings comprise details 130 of desired host names or FQDNs for the respective server components 113. These details 130 are transmitted from the server components 113 to the configuration unit 103 and comprise, in particular, communication endpoints of the server components 113, for example in the form of OPC UA server endpoint URLs.

Figure 2:
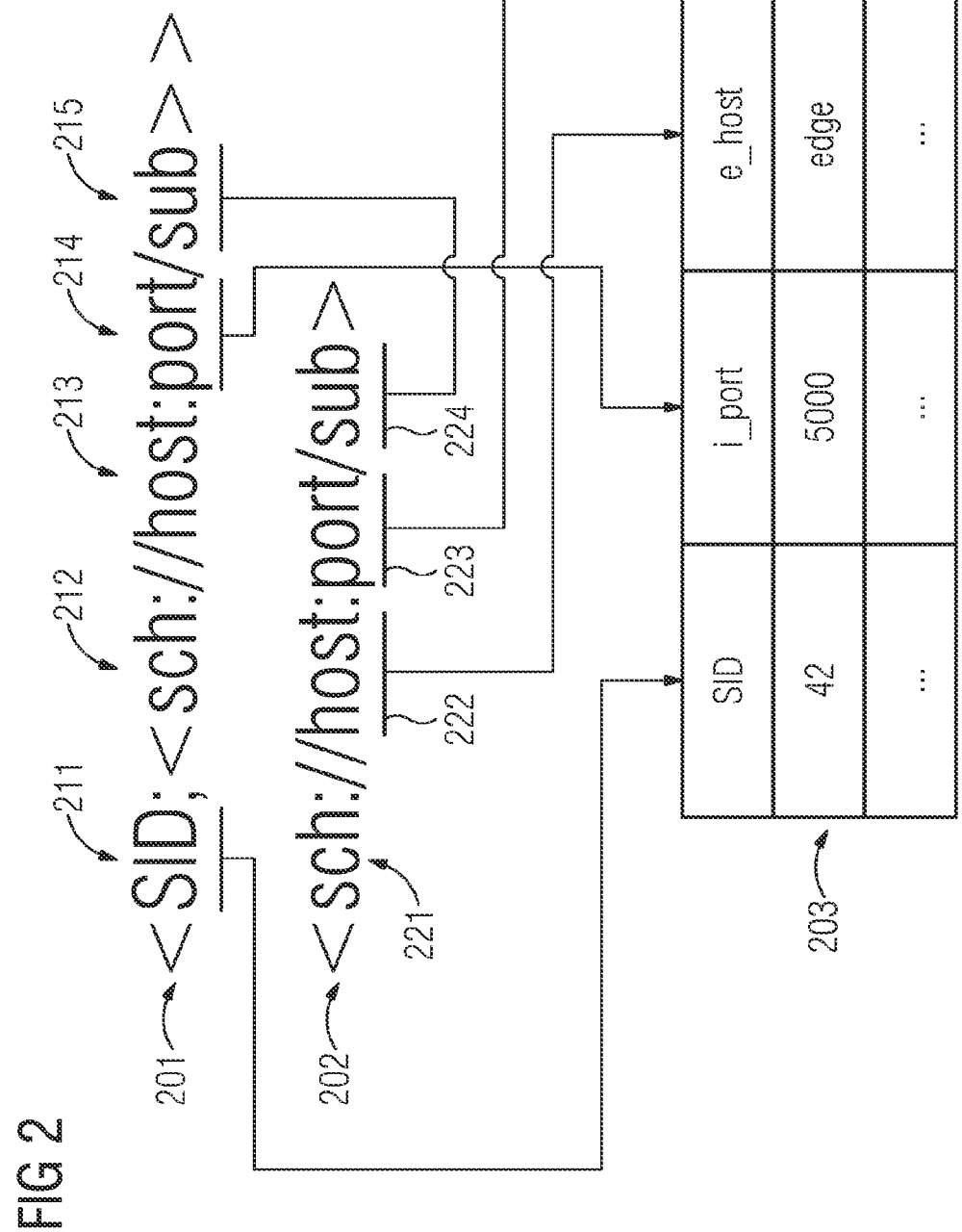
FIG. 2 shows a schematic view of a conversion between addressing information valid within a subnetwork comprising the server component of FIG. 1 and globally valid access information.

In particular, in both the above approaches, the server components 113 or the directory service components 114 each transmit an identifier 110, 211 for the respective server component 113 to the configuration unit 103 (see also FIG. 2), or alternatively to the aggregator component 104 also. Based on the identifier 110, 211 for the respective server component 113, the configuration unit 103 in each case preferably determines the globally valid access information 150, 202 assigned to the addressing information 120, 130, 201 that is valid within the subnetwork 100. The identifiers 110, 211 can, for example, be server identifiers or software container identifiers. The forwarding or filter rules 140 map, in particular, assignments between addressing information 120, 130, 201 assigned to the identifiers 110, 211 that are valid within the subnetwork 100 and the globally valid access information 150, 202, and comprise rules for port forwarding. These rules are summarized in a conversion table 203 shown in FIG. 2 which is managed by the configuration unit 103 or by the comparison unit 105.

The conversion table 203 identifies server components 113 based on their assigned identifiers 211 and allocates one or more external FQDNs 222 and TCP ports 223 to them. If a plurality of ports are registered or marked, then the conversion table 203 comprises a plurality of entries or rows with the same identifier 211, but with different ports 223. Schema elements 212, 221 and path elements 215, 224 are transferred directly from the addressing information 201 valid within the subnetwork 100 for the globally valid access information 202. Conversely, in the case of host details 213, 222 and port details 214, 223, differences may occur, so that externally valid host details 222 and port details 223 can be found in the conversion table 203.

If a gateway operating mode is desired for the subnetwork 100 shown in FIG. 1, then the aforementioned transposition between addressing information 120, 130, 201 valid within the subnetwork 100 and globally valid access information 150, 202 is no longer required. Instead, the configuration unit 103 generates forwarding or filter rules 140 only for server components 113 to which globally valid access information is, a priori, already assigned.

The globally valid access information 150, 202 preferably comprises addressing information and access authorizations, wherein the access authorizations are made available only after successful user or device authentication. In particular, the forwarding or filter rules 140 map access authorizations onto selected services for selected or authorized users or devices only.

Figure 3:
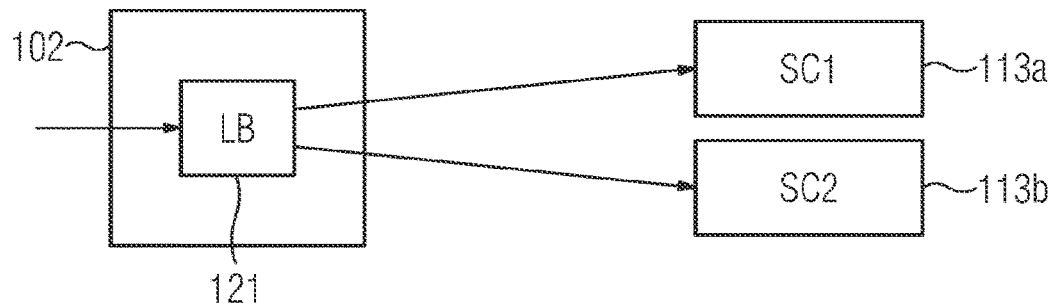
FIGS. 3-5 in each case show a gateway component for the arrangement of FIG. 1, in each case having one or more load balancers or reverse proxies.
Figure 4:
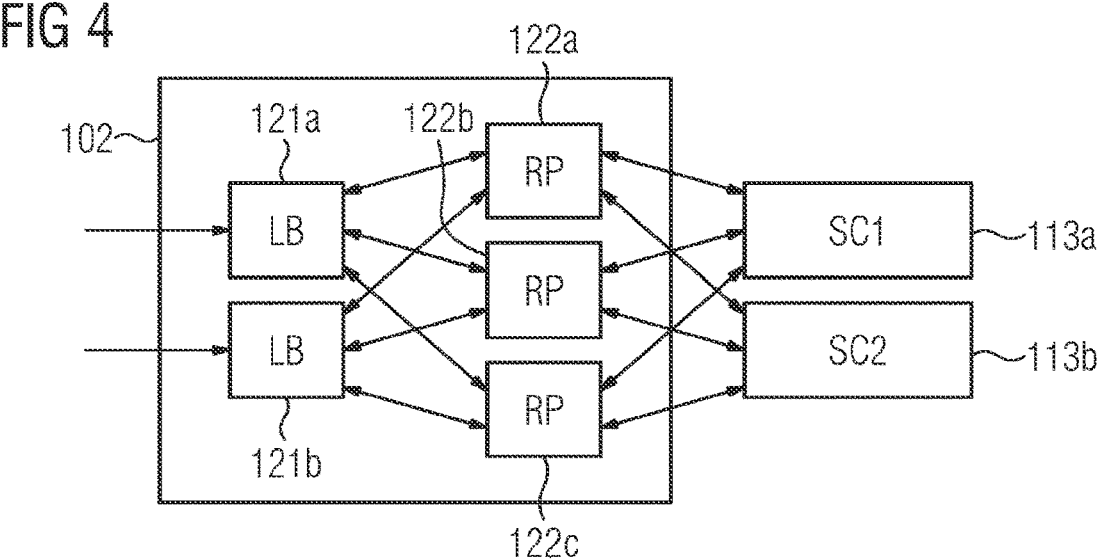
Figure 5:
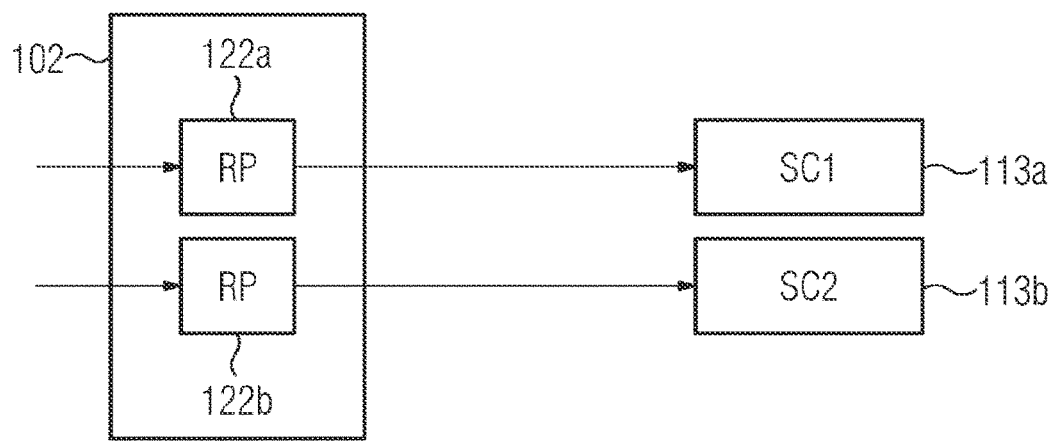

According to FIGS. 3 to 5,
one or more globally valid IP addresses,
an individual port for each server component or a common port for all server components, or
an individual domain name for each server component or a common domain name for all server components are forwarded by the gateway component 102 onto the server components 113a, 113b based on the operating mode 131 predefined via the configuration unit 103. In particular, the gateway component 102 comprises one (FIG. 3) or a plurality of load balancers (FIG. 4) or reverse proxies (FIGS. 4 and 5). A number and a connection of load balancers 121, 121a-121b or reverse proxies 122a-122c are predefined by the operating mode 131.

The configuration unit 103 assigns external FQDNs and ports to the individual server components 113a, 113b in accordance with the respectively chosen operating mode. A plurality of OPC UA servers, for example, can be provided via container virtualization in a cluster as required in accordance with one of the below-described variants.

1. One External IP Address with Many External Port Numbers

Either only a single FQDN or a plurality of server-component-specific FQDNs can be mapped onto the IP address. However, the FQDNs are essentially of no further importance. Instead of one IP address, a plurality of IP addresses can be used from the point of view of redundancy, but they are not server-component-specific.

2. A Plurality of Server-Component-Specific FQDNs

In this case, only one external IP address and only one port with many server-component-specific FQDNs are used. The server components are differentiated purely on the basis of their FQDNs. Here also, a plurality of, in particular interchangeable, IP addresses can be used from the point of view redundancy.

3. A Plurality of Server-Component-Specific External IP Addresses

Two ports are used here in each case for the local directory service and the respective server component.

4. One External IP Address with Only One FQDN

In this case, one external IP address with only one port and with only one FQDN is used for the gateway component. Reverse proxies are used in the gateway operating mode. Forwarding to the respective server component is performed only on the basis of server URIs that have been transmitted during a secure channel set-up, but not on the basis of FQDNs or port numbers.

Different gateway configurations with one or more load balancers 121, 121a-121b, a plurality of reverse proxies, no load balancer or no reverse proxy are possible:

1. one load balancer 121 only with a TCP port forwarding function to the respective server component 113a, 113b (variant 1, see FIG. 3),
2. two-layer architecture with a plurality of load balancers 121a, 121b, which distribute a connection load among a plurality of downstream reverse proxies 122a-122c, where the reverse proxies 122a-122c forward incoming transport layer connections to the respective server component 113a, 113b based on URLs transmitted during a connection set-up or URIs transmitted during a session set-up (variant 2, see FIG. 4),
3. a plurality of reverse proxies 122a-122b (without load balancers) not only forward incoming transport layer connections to the respective server component 113a, 113b, but simultaneously serve as load balancers by being contactable directly via external IP addresses (variant 3, see FIG. 5).

Either configuration 2 or configuration 3 can be used for variant 4. The reverse proxies forward incoming requests based on a respective server component URI (see "application URI" protocol field or service field according to OPC UA specifications), rather than based on an endpoint URL.

Figure 6:
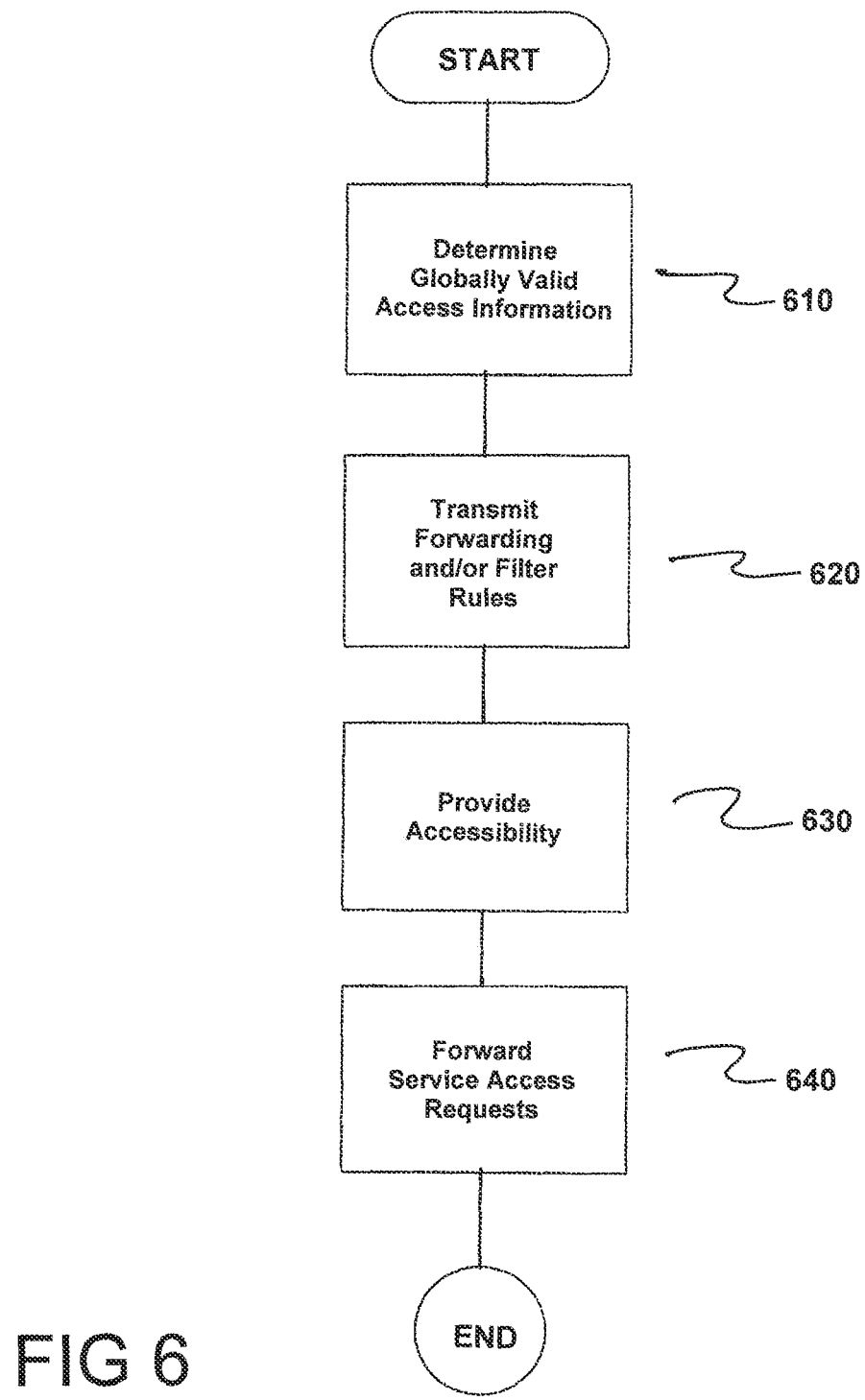
FIG. 6 is a flowchart of the method in accordance with the invention.

FIG. 6 is a flowchart of the method for providing time-critical services via a flow control environment, where at least one server component 113 is assigned to each respective service, and the server component 113 is formed by a flow control component loadable into and executable in the flow control environment 112.

The method comprises determining, by a configuration unit 103 for at least one gateway component 102 of a subnetwork 100 comprising the flow control environment, globally valid access information 150 assigned to addressing information of each server component that is valid within the subnetwork, as indicated in step 610. Here, at least one gateway component connected in parallel and/or in series is used based on an operating mode 131 predefined via the configuration unit, the at least one gateway component comprises a load balancer and/or a reverse proxy, and a number and a connection of load balancers 121, 121a-121b or reverse proxies 122a-122c is predefined by the operating mode.

Next, the configuration unit transmits forwarding and/or filter rules 140 that map the access information to the at least one gateway component, as indicated in step 620.

Next, an aggregator component (104) provides accessibility of the globally valid access information available for use of the services outside the subnetwork, as indicated in step 630.

Next, the at least one gateway component forwards service access requests 11 to the server component in accordance with the forwarding or filter rules and the operating mode, as indicated in step 640.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing time-critical services via a flow control environment, at least one server component being assigned to each respective service, said server component being formed by a flow control component loadable into and executable in the flow control environment, the method comprising:
   determining, by a configuration unit for at least one gateway component of a subnetwork comprising the flow control environment, globally valid access information assigned to addressing information of each server component which is valid within the subnetwork, at least one gateway component connected in parallel and/or in series being used based on an operating mode predefined via the configuration unit, the at least one gateway component comprising a load balancer and/or a reverse proxy, and a number and a connection of load balancers or reverse proxies being predefined by the operating mode;
   transmitting, by the configuration unit, forwarding and/or filter rules which map the access information to the at least one gateway component;
   providing, by an aggregator component, accessibility of the globally valid access information available for use of the services outside the subnetwork; and
   forwarding, by the at least one gateway component, service access requests to the server component in accordance with the forwarding or filter rules and the operating mode;
   wherein a plurality of mutually redundant aggregator components are used.

2. The method as claimed in claim 1, wherein the flow control components comprise software containers which each execute on a host operating system of a server device isolated from other software containers within the flow control environment.

3. The method as claimed in claim 1, wherein the server components or directory service components assigned in each case to server component transmit the address information valid within the subnetwork to one of (i) the configuration unit and (ii) the aggregator component.

4. The method as claimed in claim 2, wherein the server components or directory service components assigned in each case to server component transmit the address information valid within the subnetwork to one of (i) the configuration unit and (ii) the aggregator component.

5. The method as claimed in claim 3, wherein the server components or the directory service components each transmit an identifier for the respective server component to the configuration unit.

6. The method as claimed in claim 5, wherein the configuration unit in each case determines the globally valid access information assigned to the addressing information which is valid within the subnetwork based on the identifier.

7. The method as claimed in claim 6, wherein the forwarding and/or filter rules map assignments between addressing information assigned to the identifiers which is valid within the subnetwork and the globally valid access information, and wherein the forwarding and/or filter rules comprise rules for port forwarding.

8. The method as claimed in claim 5, wherein the identifiers comprise server identifiers or software container identifiers.

9. The method as claimed in claim 6, wherein the identifiers comprise server identifiers or software container identifiers.

10. The method as claimed in claim 7, wherein the identifiers comprise server identifiers or software container identifiers.

11. The method as claimed in claim 1, wherein the globally valid access information comprises addressing information and access authorizations, and wherein the access authorizations are made available following successful user and/or device authentication.

12. The method as claimed in claim 11, wherein the forwarding and/or filter rules map access authorizations onto selected services for selected users and/or devices.

13. The method as claimed in claim 1, wherein at least one of (i) at least one globally valid IP addresses, (iI) an individual port for each server component or a common port for all server components and (iii) an individual domain name for one of each server component and a common domain name for all server components are forwarded by the at least one gateway component onto the server components based on the operating mode predefined via the configuration unit.

14. The method as claimed in claim 13, wherein, in one selected operating mode, only service access requests to server components of which the respective address information valid within the subnetwork simultaneously has a global validity are forwarded by the at least one gateway component.

15. The method as claimed in claim 1, wherein the locally valid addressing information comprises at least one of communication network addresses, port numbers, host names and complete domain names.

16. A system for the provision of time-critical services via a flow control environment, comprising:
   a flow control environment;
   a plurality of server components, each of said plurality of server components being assigned to a service and formed by a flow control component loadable into and executable in the flow control environment;
   at least one gateway component of a subnetwork comprising the flow control environment;
   a configuration unit for the at least one gateway component, the configuration unit being configured to determine globally valid access information assigned to addressing information of the server components which is valid within the subnetwork and to transmit forwarding and/or filter rules which maps the access information to the at least one gateway component, based an operating mode predefined via the configuration unit, at least one gateway components connected in parallel and/or in series being used, and the at least one gateway component being at least one of a load balancer and a reverse proxy, and at least one of (i) a number and a connection of load balancers and (ii) reverse proxies being predefined by the operating mode;
   an aggregator component which is configured to make the globally valid access information available for use of the services outside the subnetwork;
   wherein the at least one gateway component is configured to forward service access requests to the server components in accordance with the forwarding and/or filter rules and the operating mode; and
   wherein a plurality of mutually redundant aggregator components are used.

* * * * *